(No Model.)
T. B. HUNT.
DRAIN CUP AND STRAINER FOR AIR BRAKES FOR CARS.
No. 581,912. Patented May 4, 1897.
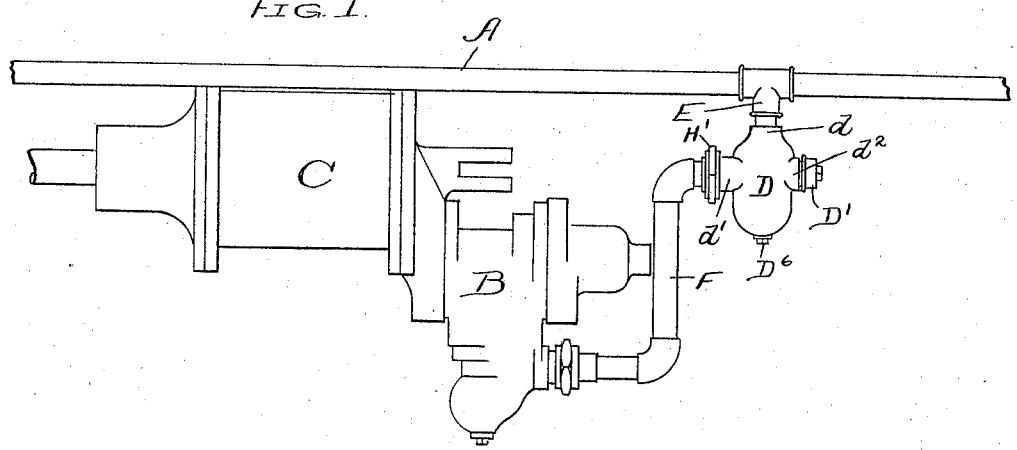
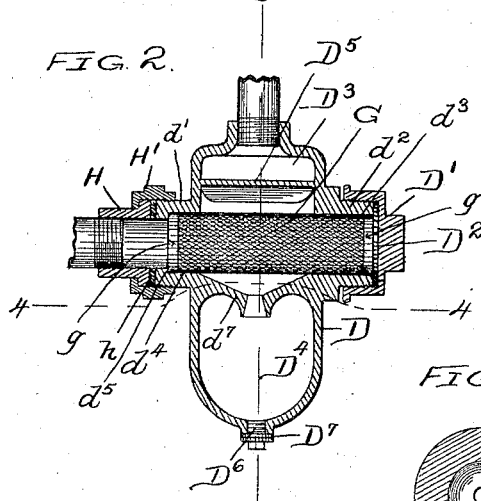
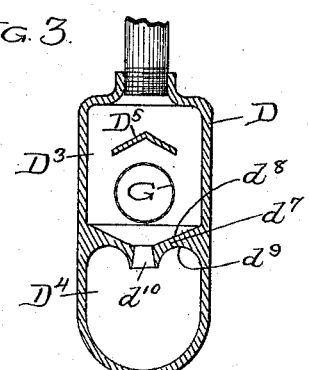
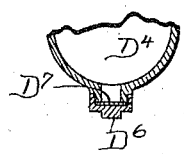
WITNESSES:
INVENTOR:
THOMAS B. HUNT
BY Munday, Evarts & Adcock.
HIS ATTORNEYS.

UNITED STATES PATENT OFFICE.

THOMAS B. HUNT, OF CHICAGO, ILLINOIS.

DRAIN-CUP AND STRAINER FOR AIR-BRAKES FOR CARS.

SPECIFICATION forming part of Letters Patent No. 581,912, dated May 4, 1897.

Application filed December 26, 1896. Serial No. 616,964. (No model.)

*To all whom it may concern:*

Be it known that I, THOMAS B. HUNT, a citizen of the United States, residing in Chicago, in the county of Cook and State of Illinois, have invented a new and useful Improvement in Drain-Cups and Strainers for Air-Brakes for Cars, of which the following is a specification.

My invention relates to improvements in a combined drain-cup and strainer for air-brakes of cars, and more particularly to improvements upon the invention heretofore patented to me in Letters Patent of the United States, No. 569,203, dated October 13, 1896.

In my present improvement the drain-cup and strainer are located in a branch pipe leading from the main air-brake pipe to the triple valve, as set forth in my former patent, and the drain-cup is also preferably of substantially the same form and arranged vertically, but in my present improvement the cylindrical strainer extends horizontally across the upright drain-cup. By this new combination of the parts the air to be strained and cleaned does not enter inside the strainer until after it passes through the mesh of the strainer in the straining and cleaning operation. The water and dirt separated from the air by the straining operation are thus not deposited within the strainer, but, on the contrary, are collected in the drain-cup outside of and below the strainer. This leaves the full periphery of the strainer operative for straining purposes and unobstructed by the dirt or sediment separated from the air and collected in the drain-cup.

In my present improvement I also provide an inclined shield above the strainer in the path of the air from the inlet-pipe which serves to deflect a great portion of the water or moisture and dirt that may be in the air away from the strainer and thus prevents any tendency of the same to collect upon the outer periphery of the strainer.

My invention consists in these features and also in the novel construction of parts and devices and in the novel combinations of parts and devices herein shown and described, and specified in the claims.

In the accompanying drawings, which form a part of this specification and in which similar letters of reference indicate like parts throughout all the views, Figure 1 is a side elevation of a device embodying my invention. Fig. 2 is a central vertical longitudinal section. Fig. 3 is a vertical cross-section on the line 3 3 of Fig. 2. Fig. 4 is a horizontal section on the line 4 4 of Fig. 2. Fig. 5 represents a modification in which the opening at the bottom of the drain-cup is closed by a screw-cap as an equivalent for the plug shown in Fig. 2, and Fig. 6 shows a modification in which the opening through which the horizontal cylindrical strainer is inserted and removed is closed by a screw-plug as an equivalent for the screw-cap shown in Fig. 2.

In said drawings, A represents the main air-brake pipe of a railway-train, and B one of the triple or other valves controlling the connection between the main pipe A and the auxiliary reservoir C. All these parts may be of any ordinary or suitable construction now familiar to those skilled in the art, and therefore need no detailed description.

D is the drain-cup, the same occupying an upright or vertical position and being connected at its upper end or nipple $d$ to the main air-brake pipe A by a T-coupling or other suitable connection E. The drain-cup D has a screw-threaded nipple $d'$ projecting from its cylindrical surface about midway of its length and connected to the branch pipe F, leading to the triple valve B, by a screw-threaded union or coupling H H', a gasket or packing $h$ being interposed between the coupling ring or part H and threaded nipple $d'$. Diametrically opposite the nipple $d'$ on the upright cylindrical drain-cup D is a corresponding screw-threaded nipple or tubular projection $d^2$, having a cylindrical opening $d^3$, through which the removable cylindrical strainer G may be inserted and removed. The nipple $d'$ has a cylindrical bore $d^4$ fitting the inner end of the strainer G and supporting the same, said bore $d^4$ terminating with a shoulder $d^5$, against which the end of the strainer abuts to hold the strainer in position longitudinally. The opening $d^3$ in the nipple $d^2$ is closed by a screw cap or plug D', threaded to the nipple $d^2$, a packing or gasket D² being inserted between the cap or plug and the nipple $d^2$, as is clearly illustrated in Figs. 2 and 6. The drain-cup D has two interior portions or chambers $D^3$ $D^4$, separated, or partially separated, from each other by an intermediate wall or partition $d^7$, the upper or air chamber $D^3$ containing the horizontal or transverse strainer G, and the lower or dust-collecting chamber $D^4$ being below the strainer G and serving as a receptacle for the water and dirt separated from the air by the strainer G or by its shield $D^5$, with which the drain-cup D is provided above the strainer. The upper surface $d^8$ of the intermediate web or partition $d^7$ is made conical or inclined, as clearly shown in the drawings at Figs. 2 and 3, in order to prevent water or dirt from collecting thereon. The lower surface $d^9$ of the web or partition $d^7$ is recurved, as is clearly shown in Figs. 2 and 3, in order that it may thus tend to downwardly deflect any dirt collected in the lower chamber $D^4$ of the drain-cup and stirred up by the air when forcibly passing into the drain-cup through the branch pipe F. The web or partition $d^7$ is provided with a central hole or opening $d^{10}$ through it to permit the dirt and water to pass from the upper chamber $D^3$ to the lower or dirt-collecting chamber $D^4$. The water and dirt deflector or shield $D^5$ for the drain-cup is located above the strainer G in the air-chamber $D^3$ of the drain-cup, and is preferably inclined, as indicated in the drawings, to prevent water or dirt collecting thereon. This inclined shield serves to deflect a large proportion of the dirt and water or moisture in the air away from the strainer G, thus causing the same to pass directly into the dirt-collecting chamber $D^4$ of the drain-cup.

The strainer G may be made of any suitable construction and either double or single, as shown and described in my former patent. It should, however, be provided with internal rings $g$ at each end to strengthen the same and to furnish the same with shoulders or means for getting hold of to pull the strainer out of the drain-cup when the cap or plug D' is removed.

The dirt deflector or shield $D^5$ may be supported in position above the strainer G in the drain-cup D by any suitable means, but the preferable and simpler construction is to make or cast it in one integral piece with the drain-cup D. The drain-cup D is furnished with an opening at its lower end for discharging the dust and water that may be collected in it, the opening being closed by a screw-threaded plug or cap $D^6$, a gasket or packing-ring $D^7$ being interposed.

In Figs. 2 and 3 the cleaning-opening in the bottom of the drain-cup is shown as being closed by a screw-plug. In the modification as illustrated in Fig. 5 it is shown as being closed by a screw-cap, as either a cap or plug may be used for this purpose. In like manner I have shown in Fig. 6 a screw-plug as an equivalent for the screw-cap for closing the opening in the nipple $d^2$, through which the movable strainer is inserted and removed when required.

I claim—

1. In an air-brake apparatus, the combination with the main air-brake pipe and the triple valve controlling the communication with the brake-cylinder, of an upright drain-cup interposed between said main pipe and valve, and a removable strainer extending transversely across the drain-cup, said drain-cup having an opening at its lower end for cleaning the same, an opening and nipple at one end of the transverse strainer for connection with the pipe leading to said triple valve, and an opening at the end of the transverse strainer for the removal of the strainer, substantially as specified.

2. The combination with the main air-brake pipe and valve of a branch pipe leading from the main pipe and communicating with the valve, of a drain-cup located in said branch pipe and interposed between said main pipe and said valve, and a cylindrical strainer extending transversely across the drain-cup, said drain-cup having openings and nipples at the opposite ends of said strainer, one for connecting with the pipe leading to said valve and one for receiving a cap or plug to close the opening through which the strainer is removed for cleaning, substantially as specified.

3. The combination with the main air-brake pipe and valve of a branch pipe leading from the main pipe and communicating with the valve, of a drain-cup located in said branch pipe and interposed between said main pipe and said valve, and a cylindrical strainer extending transversely across the drain-cup, said drain-cup having an upper or air chamber in which the strainer is mounted, and a lower or dirt-collecting chamber below the strainer, said drain-cup having openings and nipples at the opposite ends of said strainer, one for connecting with the pipe leading to said valve and one for receiving a cap or plug to close the opening through which the strainer is removed for cleaning, substantially as specified.

4. The combination with the main air-brake pipe and valve of a branch pipe leading from the main pipe and communicating with the valve, of a drain-cup located in said branch pipe and interposed between said main pipe and said valve, and a cylindrical strainer extending transversely across the drain-cup, said drain-cup having an upper or air chamber in which the strainer is mounted, and a lower or dirt-collecting chamber below the strainer, the web or partition separating the upper and lower chambers of the drain-cup having an inclined or conical surface terminating in a central opening, substantially as specified.

5. The combination with the main air-brake pipe and valve of a branch pipe leading from the main pipe and communicating with the valve, of a drain-cup located in said branch pipe and interposed between said main pipe and said valve, and a cylindrical strainer extending transversely across the drain-cup, said drain-cup having an upper or air chamber in which the strainer is mounted, and a lower or dirt-collecting chamber below the strainer, the web or partition separating the upper and lower chambers of the drain-cup having an inclined or conical surface terminating in a central opening, and a recurved lower surface, substantially as specified.

6. The combination with the main air-brake pipe and valve of a branch pipe leading from the main pipe and communicating with the valve, of a drain-cup located in said branch pipe and interposed between said main pipe and said valve, and a cylindrical strainer extending transversely across the drain-cup, and a dirt-deflector above the strainer, said drain-cup having openings and nipples at the opposite ends of said strainer, one for connecting with the pipe leading to said valve and one for receiving a cap or plug to close the opening through which the strainer is removed for cleaning, substantially as specified.

7. The combination with the main air-brake pipe and valve of a branch pipe leading from the main pipe and communicating with the valve, of a drain-cup located in said branch pipe and interposed between said main pipe and said valve, and a cylindrical strainer extending transversely across the drain-cup, and an inclined dirt-deflector above the strainer, said drain-cup having openings and nipples at the opposite ends of said strainer, one for connecting with the pipe leading to said valve and one for receiving a cap or plug to close the opening through which the strainer is removed for cleaning, and said drain-cup having an upper or air chamber in which the strainer is mounted, and a lower or dirt-collecting chamber below the strainer and separated from the upper chamber by a perforated web or partition, said lower chamber having an opening at its lower end for clearing the same, substantially as specified.

8. The combination with the main air-brake pipe and valve, and a branch pipe leading from the main pipe and communicating with the valve and an upright drain-cup D divided into upper and lower chambers $D^3$, $D^4$ by an intermediate web or partition having an opening through the same, of a horizontal strainer extending transversely across the drain-cup in the upper chamber thereof, substantially as specified.

9. The combination with the main air-brake pipe and valve, and a branch pipe leading from the main pipe and communicating with the valve and an upright drain-cup D divided into upper and lower chambers $D^3$, $D^4$ by an intermediate web or partition having an opening through the same, of a horizontal strainer extending transversely across the drain-cup in the upper chamber thereof, and an inclined shield or deflector above the strainer, substantially as specified.

10. The combination with drain-cup D having upper and lower chambers $D^3$ $D^4$, and a web or partition $d^7$ dividing the same, and provided with nipples or tubular projections $d'$ $d^2$ on opposite sides of a cylindrical strainer extending transversely through said drain-cup and fitting in and supported by said nipples or tubular projections at each end, substantially as specified.

11. The combination with drain-cup D having upper and lower chambers $D^3$ $D^4$, and a web or partition $d^7$ dividing the same, and provided with nipples or tubular projections $d'$ $d^2$ on opposite sides of a cylindrical strainer extending transversely through said drain-cup and fitting in and supported by said nipples or tubular projections at each end, and an air-inlet pipe at the upper end of said drain-cup, substantially as specified.

12. The combination with drain-cup D having upper and lower chambers $D^3$ $D^4$, and a web or partition $d^7$ dividing the same, and provided with nipples or tubular projections $d'$ $d^2$ on opposite sides of a cylindrical strainer extending transversely through said drain-cup and fitting in and supported by said nipples or tubular projections at each end, and an air-inlet pipe at the upper end of said drain-cup, and an air-pipe F connected with said nipple or tubular projection $d'$, and a screw cap or plug closing said nipple or tubular projection $d^2$, and a dirt deflector or shield $D^5$ above said strainer G, substantially as specified.

THOMAS B. HUNT.

Witnesses:
H. M. MUNDAY,
EDMUND ADCOCK.